Oct. 12, 1954     W. S. STAIR     2,691,277
ICE-MAKING APPARATUS AND METHOD
Filed March 7, 1951     9 Sheets-Sheet 1

Oct. 12, 1954  W. S. STAIR  2,691,277
ICE-MAKING APPARATUS AND METHOD
Filed March 7, 1951  9 Sheets-Sheet 2

INVENTOR
William S. Stair
BY
Curtis, Morris + Safford
ATTORNEYS

Oct. 12, 1954  W. S. STAIR  2,691,277
ICE-MAKING APPARATUS AND METHOD
Filed March 7, 1951  9 Sheets—Sheet 3

INVENTOR
William S. Stair
BY
Curtis, Morris + Safford
ATTORNEYS

Oct. 12, 1954   W. S. STAIR   2,691,277
ICE-MAKING APPARATUS AND METHOD
Filed March 7, 1951   9 Sheets-Sheet 4

INVENTOR
William S. Stair
BY
Curtis, Morris + Safford
ATTORNEYS

Oct. 12, 1954 W. S. STAIR 2,691,277
ICE-MAKING APPARATUS AND METHOD
Filed March 7, 1951 9 Sheets-Sheet 6

INVENTOR
William S. Stair
BY
Curtis, Morris & Safford
ATTORNEYS

Oct. 12, 1954 W. S. STAIR 2,691,277
ICE-MAKING APPARATUS AND METHOD
Filed March 7, 1951 9 Sheets-Sheet 7

INVENTOR
William S. Stair
BY
Curtis, Morris & Safford
ATTORNEYS

Oct. 12, 1954 W. S. STAIR 2,691,277
ICE-MAKING APPARATUS AND METHOD
Filed March 7, 1951 9 Sheets-Sheet 8

INVENTOR
William S. Stair
BY
Curtis, Morris + Safford
ATTORNEYS

Oct. 12, 1954  W. S. STAIR  2,691,277

ICE-MAKING APPARATUS AND METHOD

Filed March 7, 1951  9 Sheets-Sheet 9

INVENTOR
*William S. Stair*
BY
*Curtis, Morris & Safford*
ATTORNEYS

Patented Oct. 12, 1954

2,691,277

UNITED STATES PATENT OFFICE 2,691,277

ICE-MAKING APPARATUS AND METHOD

William S. Stair, York, Pa.

Application March 7, 1951, Serial No. 214,251

15 Claims. (Cl. 62—107)

This invention relates to ice-making and the like, and to a method and apparatus for freezing and removing ice from a rigid freezing surface. More in particular the present invention relates to apparatus of the above character wherein ice is frozen to a rotating cylindrical surface by the direct expansion of refrigerant in an evaporator of a refrigeration system, and wherein the entire system rotates with the freezing surface. The present invention relates to that covered by United States Letters Patent No. 2,308,541 of Francis M. Raver.

That Raver patent discloses ice-making apparatus of the above character having the components of the refrigeration system stationary except for the evaporator which rotates. Such apparatus has enjoyed considerable commercial success, but it has the characteristic that the evaporator rotates while the other components are stationary, and this characteristic has made it necessary to provide liquid and gas tight seals where the refrigerant flows to and from the evaporator, and such seals are objectionable. This is not only because of the initial cost of the seals, but because the seals make service necessary.

It is an object of the present invention to provide apparatus of the above character which is free of such seals. It is a further object to provide such apparatus which is simple and sturdy in construction, light in weight, inexpensive to manufacture and maintain and which is adaptable to varying conditions of use. It is a further object to provide an improved refrigeration system of the general type which is adaptable for use in ice-making apparatus. It is a further object to provide for all of the above with component parts of improved construction. These and other objects will be in part obvious and in part pointed out below.

The invention accordingly consists in the features of construction, combination of elements, arrangements of parts and in the several steps and relation and order of each of the same to one or more of the others, all as will be illustratively described herein, and the scope of the application of which will be indicated in the following:

In the present application, the term "ice" is at times used in its broader sense as meaning any type of congealed liquid, including all types of water and water-base fluids, such as frozen fruit juices, frozen cream, etc. The term "harvesting" is used to refer generally to the removal of the ice from the freezing surface, and specifically to the manner in which the adhesion between the ice and the freezing surface is broken.

Figure 1:
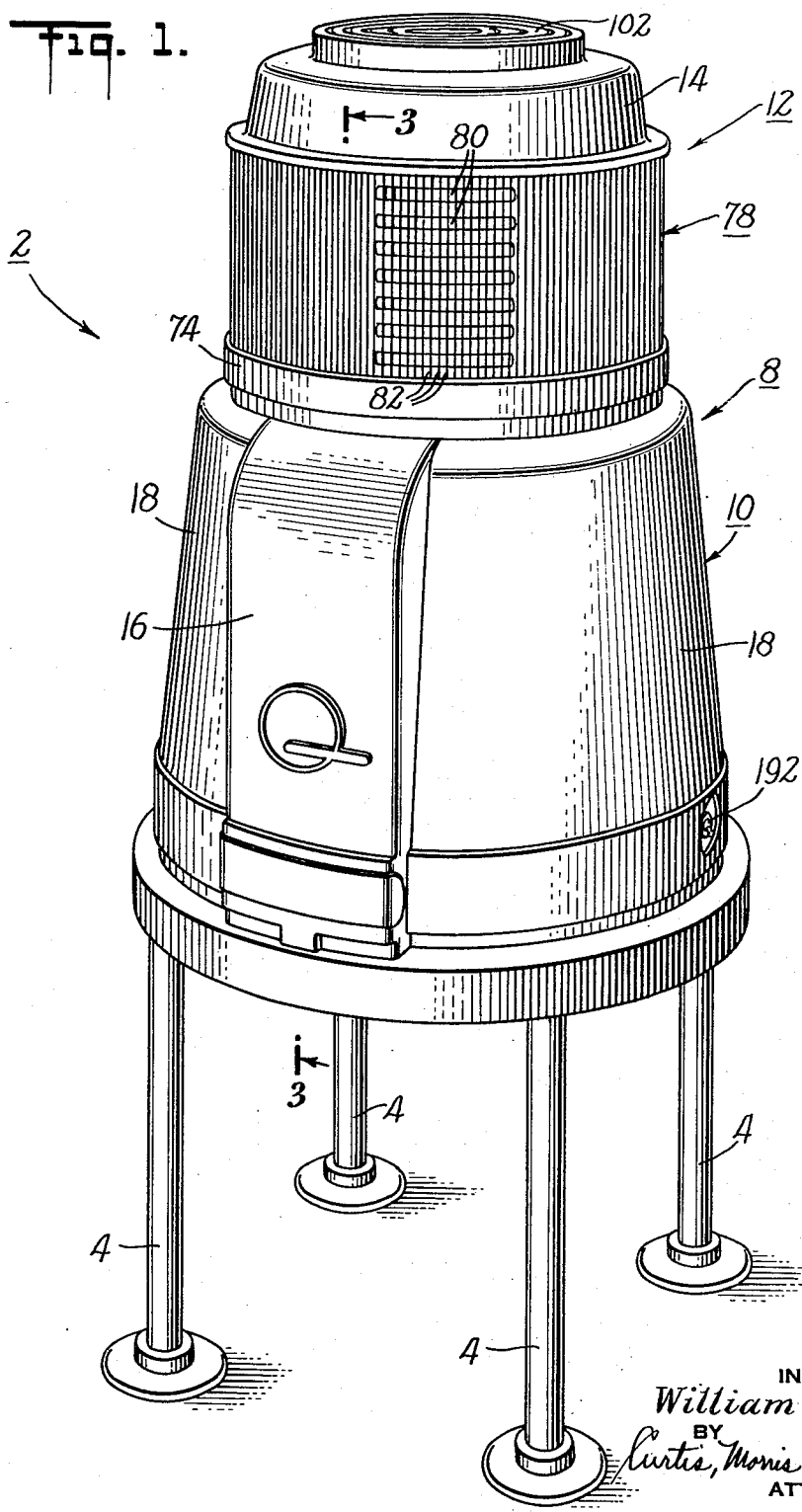
Figure 1 is a perspective view of an ice-making machine constituting an illustrative embodiment of my invention.

Referring to Figure 1 of the drawings, an ice-making machine or apparatus 2 is mounted upon four legs 4 and a stationary table-like base 6. Supported on this base is an ice-making unit or section 8 which is enclosed in a housing 10 and upon which is mounted a condensing section or unit 12 which has a removable top cover or housing 14. Housing 10 is formed by two fixed housing portions 16 and 17 (see also Figure 3) at the front and rear of the machine, and two removable shell portions 18 which extend therebetween and are somewhat frusto-conical in contour.

Figure 5:
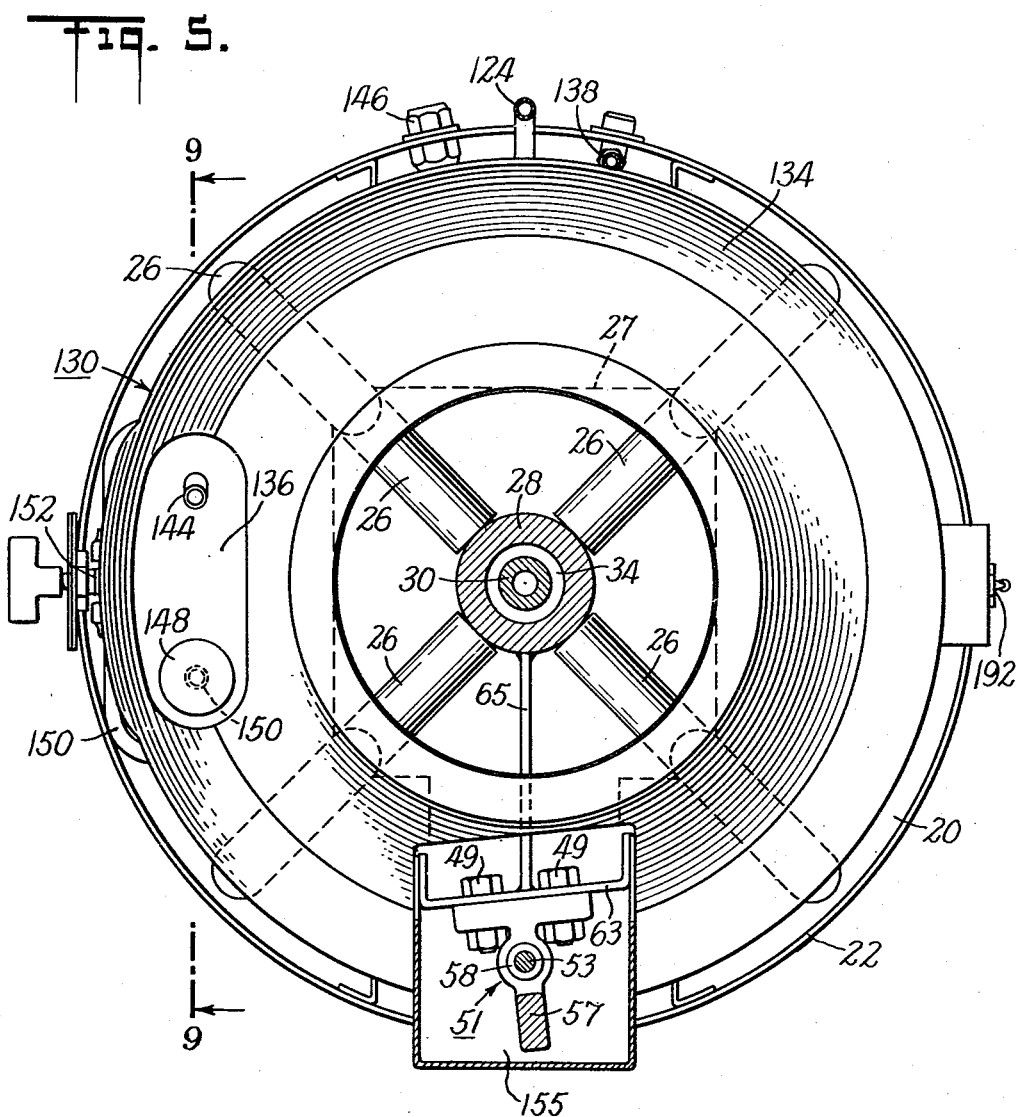

Housing 10 is stationary and rests upon base 6 and it encloses the stationary portions of the apparatus. Accordingly, as shown best in Figure 3, mounted upon base 6 is a bottom tray or plate 20 which has a peripheral wall 22, thus to provide a collector plate or sump for any liquid that escapes from the ice-making unit above; at the right there is a drain tube 24 through which any such liquid flows to a drain (not shown). Welded to plate 20 are four tubular supporting legs 26 (see also Figure 5) which extend upwardly and they curve radially inwardly. Legs 26 are welded to a central hub 28, and extending between and welded to the legs and hub is horizontal brace plate 27. Thus, a sturdy spider assembly is provided which forms a stationary support for the rotating unit 29 which is mounted in mushroom fashion on a vertical stud shaft 30 which projects downwardly through hub 28.

Figure 3:
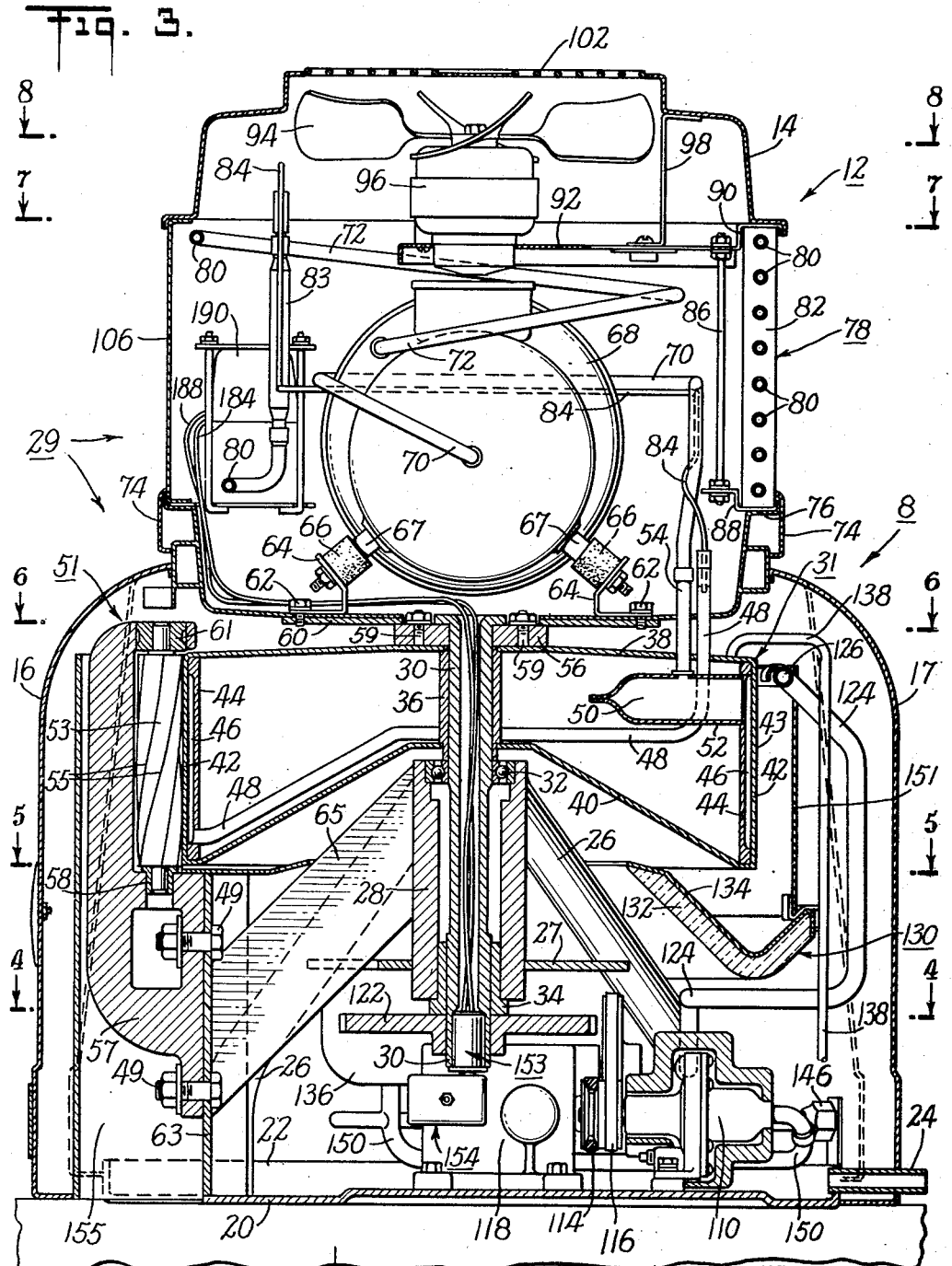
Figure 3 is a vertical sectional view on the line 3—3 of Figure 1.

Shaft 30 is supported at the top of the hub by a ball bearing 32 and at the bottom of the hub by a sleeve bearing 34. Directly above bearing 32 on shaft 30 there is a sleeve 36 which provides the hub for the freezing cylinder 31. Freezing cylinder 31 has a disc-like top wall 38, a somewhat conical bottom wall 40 and a cylindrical outer wall 42 which provides a cylindrical outer freezing surface 43. Adjacent wall 42 is an evaporator liner 44 which has top and bottom rim portions which rest against and are welded to the edges of wall 42 with the liner and wall being spaced from each other so as to provide a annular evaporator chamber 46 between the wall and liner. During operation liquid refrigerant is supplied to the lower portion of chamber 46 through a tube 48. As shown at the right of Figure 3, a gas outlet chamber 50 is provided which is formed by a sheet metal shell 52 welded at a cutaway portion of the liner 44 and open at its end into chamber 46. The gas refrigerant is withdrawn from the evaporator chamber at chamber 50 through a tube 54.

Figure 4:
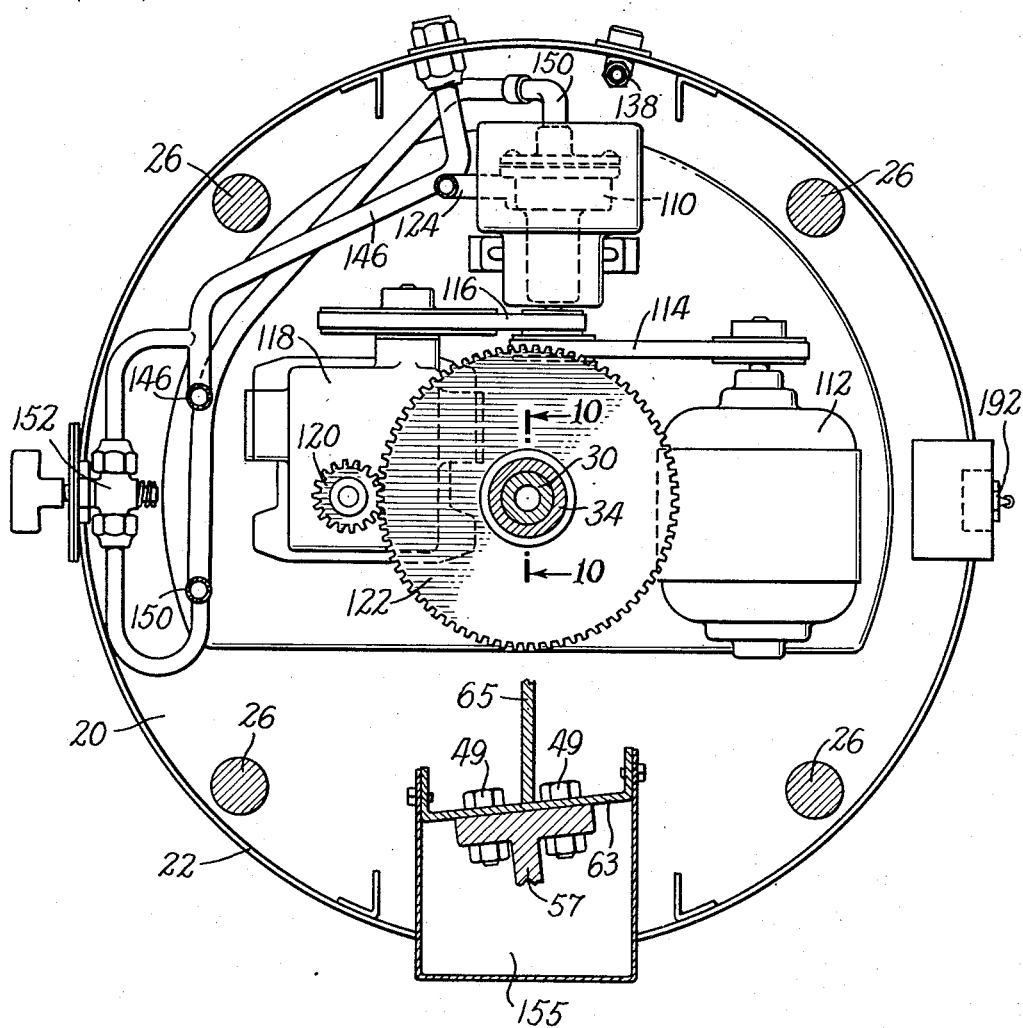
Figure 4 to 8 are sectional views on the correspondingly numbered lines of Figure 3.

As will be explained more fully below, the freezing cylinder is rotated and refrigerated, and water is supplied to it so that a layer of ice forms on the freezing surface 43. As shown at the left of Figure 3, and at the right in Figure 2, an ice-removing wedge-type of cutter 51 is mounted so as to engage and remove this layer of ice, substantially in the manner disclosed in the above-identified Raver patent. This cutter is in the form of a roller 53 having six spiral wedge ribs or cutters 55 welded thereto, and the roller is mounted on a vertical axis in a bracket 57 in lower and upper sleeve bearings 58 and 61. Bearing 61 is clamped by a set screw (not shown) in an opening in the top of bracket 57 and this opening is large enough to permit roller 53 to be drawn up through it after bearing 61 has been loosened and removed. Bracket 57 is rigidly held by bolts 49 to a channel 63 (see also Figures 4 and 5) which is welded at its bottom end to plate 20 and is braced by a plate 65 which is welded to the channel and also to hub 28.

The freezing cylinder 31 is clamped by a number of stud bolts 59 to a collar 56 which is welded to the upper end of shaft 30 and also to a mounting disc 60 which provides a table supporting not only the freezing cylinder but also the refrigerant condensing unit. Accordingly, clamped to plate 60 by stud bolts 62 are two elongated brackets 64 each of which carries a pair of support units, each of these units being a bolt 67 and a rubber collar 66; these units provide resilient support for a motor-compressor unit 68, which is of the hermetic type with a compressor directly connected to an electric motor, both enclosed within a sealed casing. Refrigerant gas to be condensed passes to unit 68 through tube 70 which is connected to tube 54, and compressed refrigerant gas passes from the compressor through a tube 72.

Figure 8:
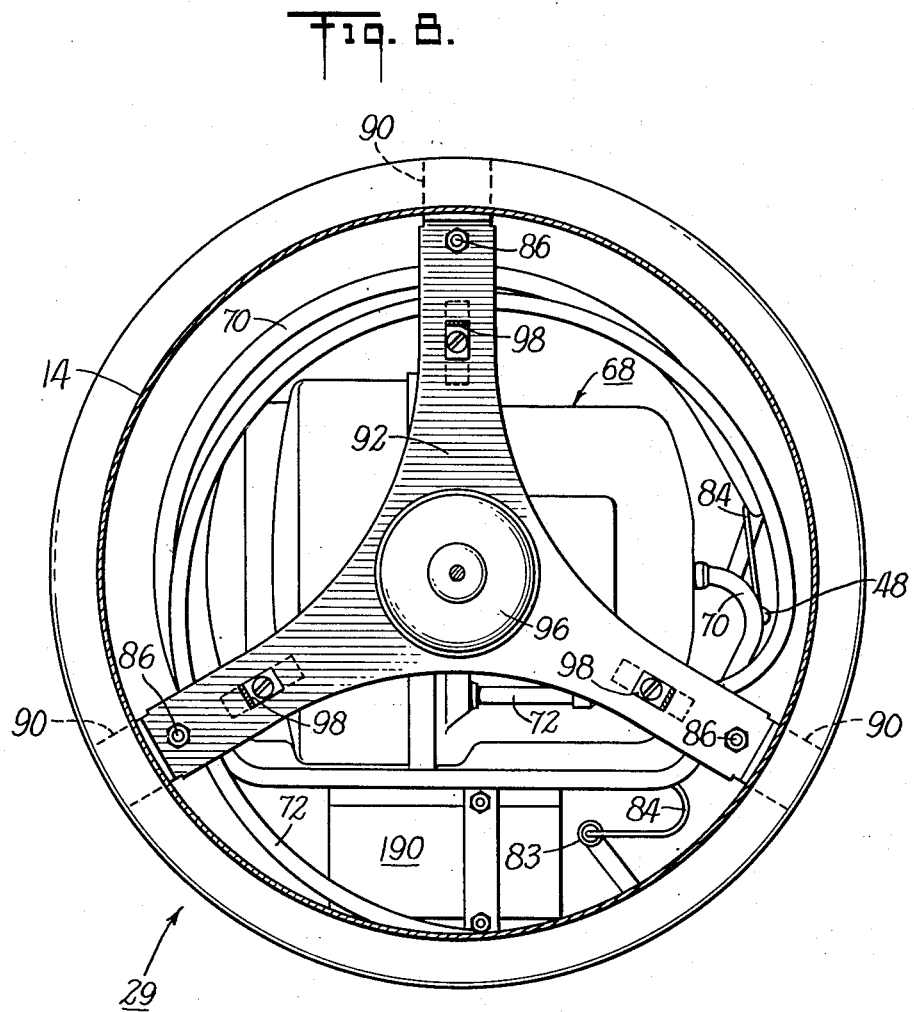

Plate 60 also has clamped to it by stud bolts 62 an annular casing and supporting structure 74 which is of sheet metal and is somewhat pan-shaped with a bottom wall and an upstanding peripheral wall. This peripheral wall has a top ledge portion 76 upon which the refrigerant condenser 78 rests (see also Figures 2 and 8). Condenser 78 is a segment of a cylinder and extends arcuately approximately two-hundred sixty degrees and it is formed by parallel tubes 80 carrying a plurality of parallel fins 82.

Condenser 78 is connected at the top to tube 72 so that it receives the compressed refrigerant gas from the compressor, and as the refrigerant condenses it flows from the bottom of the condenser through a strainer 83 and thence through a capillary tube 84 to the tube 48 which, as indicated above, supplies the liquid refrigerant to the evaporator. Capillary tube 84 produces a pressure drop in the refrigerant, and the tube passes in heat exchange relationship with the cold gas return tube 70 so that the liquid refrigerant is cooled by the returning gas. Clamped to condenser 78 by three bolts 86, and bottom and top clamps 88 and 90 is (see also Figure 8) a three-armed spider bracket 92. This bracket has rigidly mounted upon it a cooling fan 94 (Figure 3) having a motor 96.

Bracket 92 also carries three vertically extending brackets 98 which support top cover 14 which has a top grill 102. As shown at the left of Figure 3 and the lower portion of Figure 8, an arcuate sheet metal panel 106 closes the zone between the ends of condenser 78 so that it acts with the condenser to form a cylindrical casing construction. During operation fan 94 directs a stream of air upwardly through this grill so that air is drawn radially inwardly through condenser 78 and over the motor-compressor. In this way the condensing unit is maintained cool and the refrigerant is readily condensed.

It should be noted that the entire refrigeration system is hermetically sealed with the connections between the elements or component parts being brazed or welded as the case may be to provide rigid and fluid tight joints and seals. Thus, there is no necessity for moving seals or sealed bearings such as have been used in prior construction as discussed above. Furthermore, the system is sturdy and compact and it has all of the characteristics which are desired in a mass produced commercial machine of this character.

Figure 2:
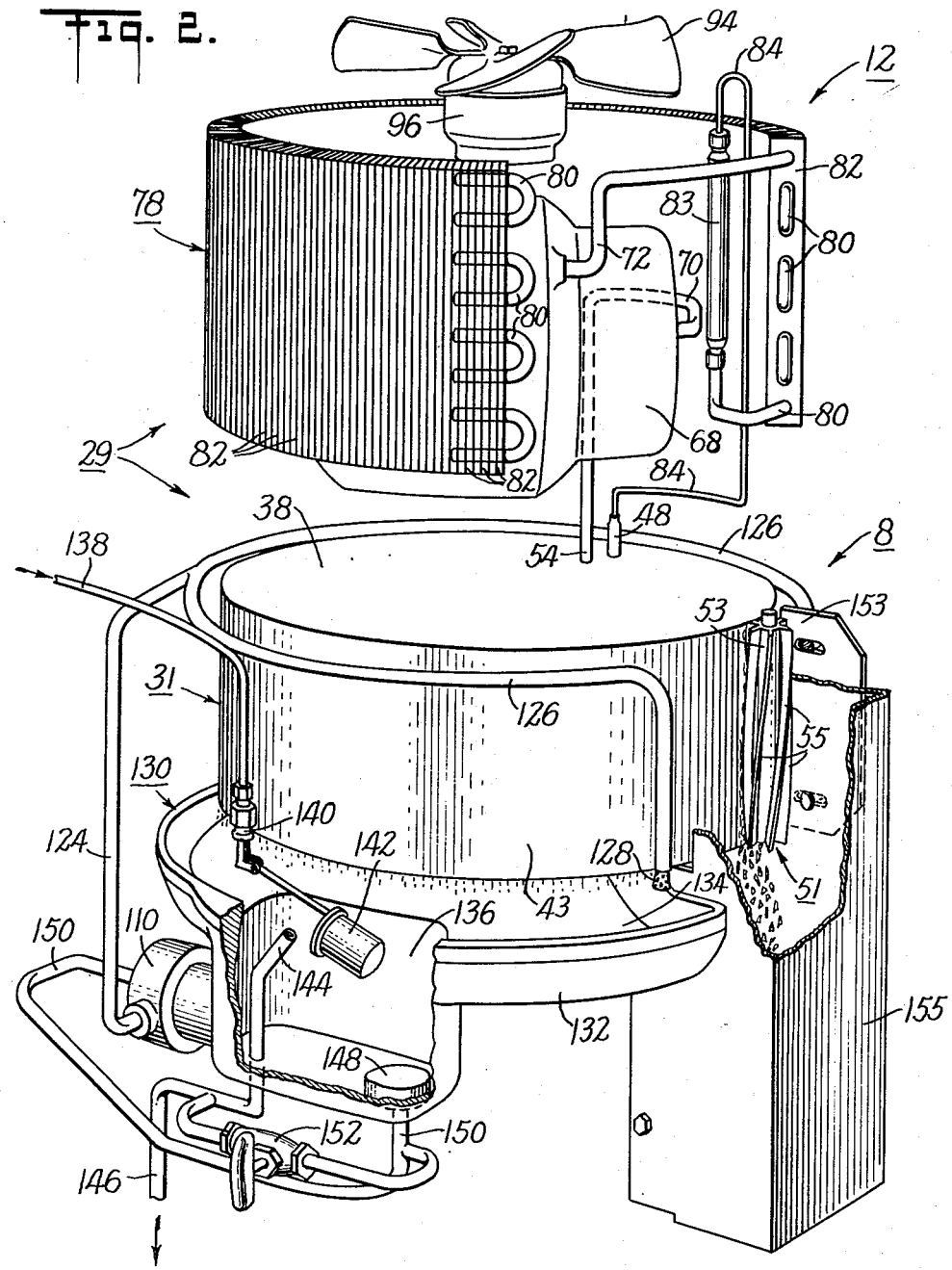
Figure 2 is a somewhat schematic perspective view of the machine of Figure 1.
Figure 6:
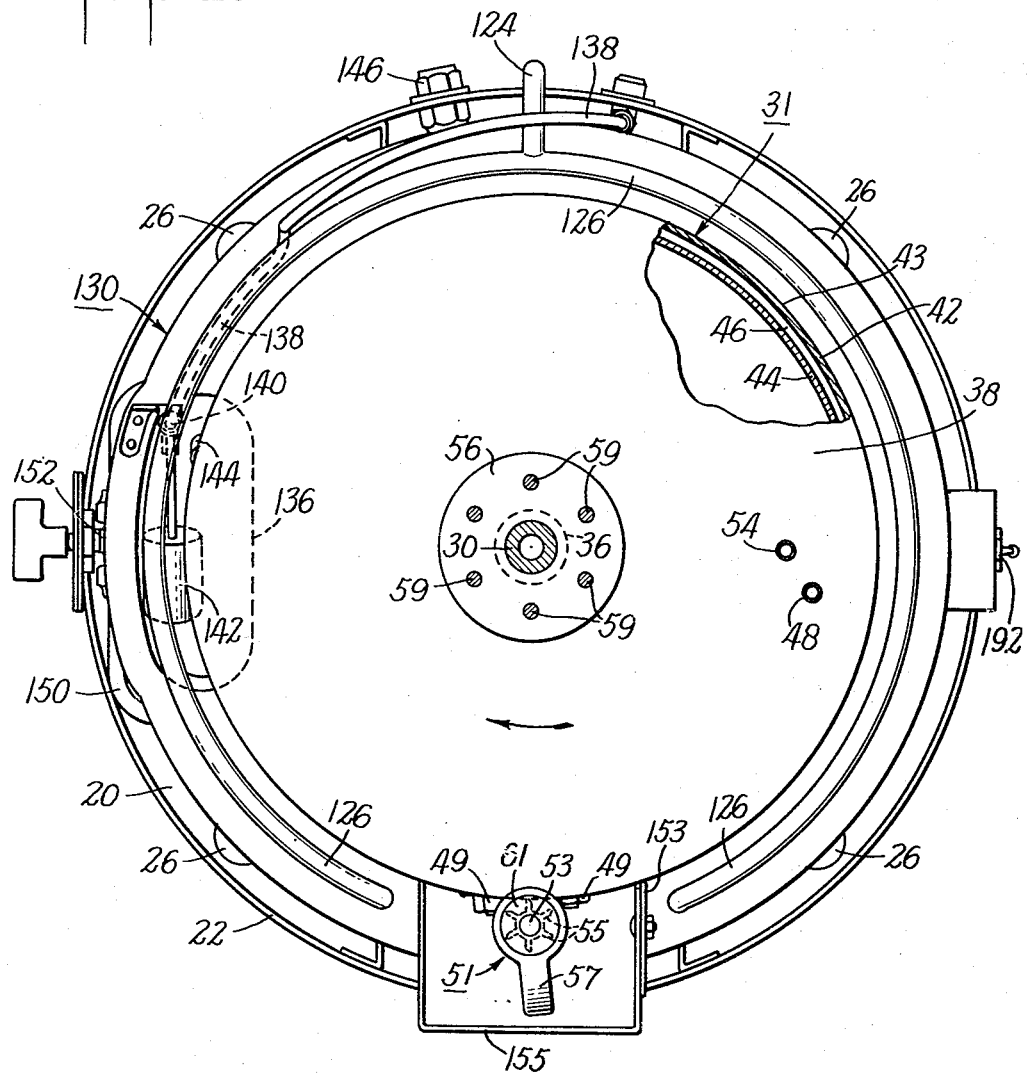
Figure 7:
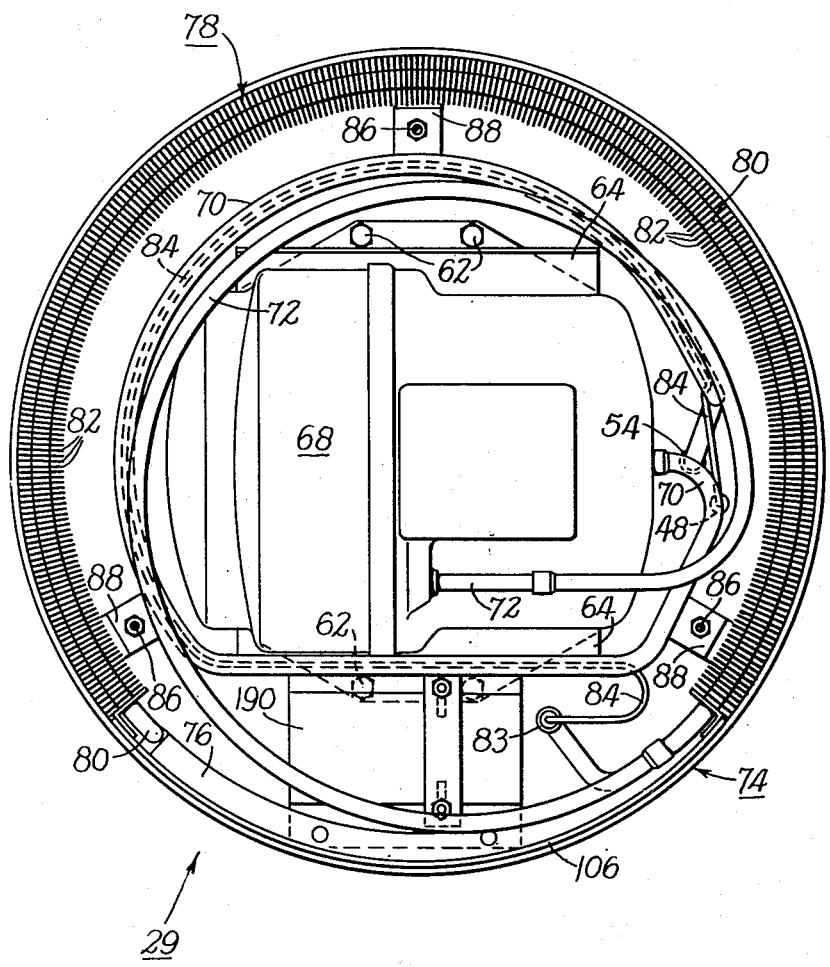

The construction described which constitutes the hermetic refrigeration system is mounted as indicated to rotate, supported in the stationary hub 28 upon shaft 30. The cylindrical freezing surface 43 of wall 42 is thereby rotated about a vertical axis and during this rotation water is directed onto it so as to form a layer of ice. This water is supplied under pressure provided (see Figure 3) by a centrifugal pump 110 which is bolted to plate 20 and is driven (see Figure 4) by an electric motor 112 through a V-belt 114. A V-belt 116 extends from the pump shaft to a pulley on a gear reduction mechanism 118 which has a gear 120 meshing to drive a gear 122 keyed to the lower end of shaft 30. As will be explained below, this rotates the shaft and the rotatable unit supported thereby and the rate of rotation of shaft 30 is so controlled as to turn the freezing surface at the rate desired for the proper freezing and harvesting of ice. The gear reduction mechanism is also bolted to plate 20 (Figure 3), and it is adjustable to change its speed reduction ratio. Water from pump 110 passes through a pipe 124 upwardly to the center of an arcuate distribution header or spray pipe 126 which is best shown in Figure 6. Pipe 126 extends substantially around the entire upper edge of the freezing surface, and it is provided with closely-spaced water-discharge openings through which small streams of water are directed onto the freezing surface. Referring to Figure 2, the ends of pipe 126 are imperforate and they extend downwardly and are closed by rubber stoppers 128 (see Figure 2) which are removed when it is desirable to flush out the pipe.

Figure 9:
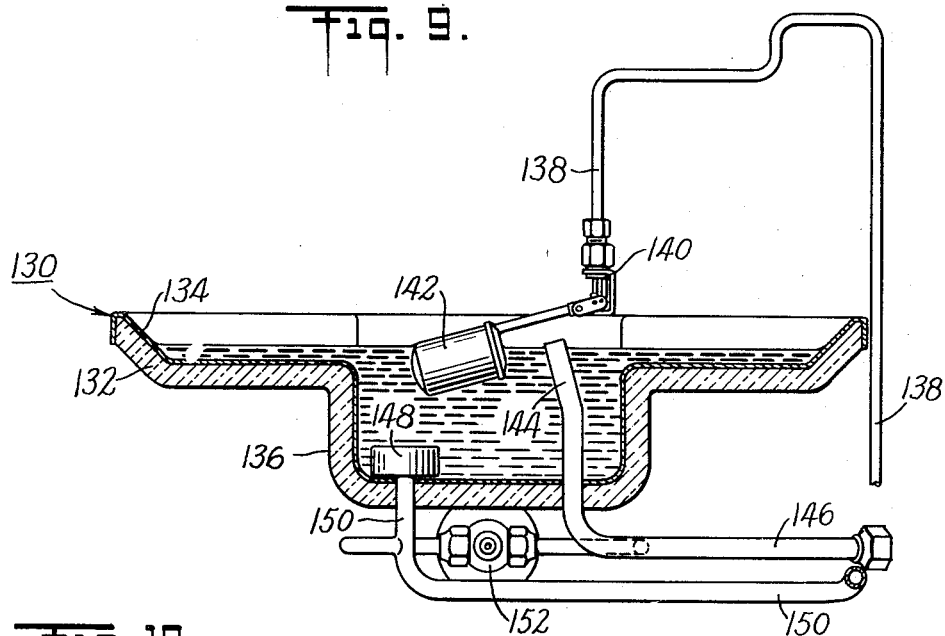
Figure 9 is a sectional view on the line 9—9 of Figure 5.

Positioned beneath the freezing surface 43 is a water collector 130 which is an annular stainless steel trough 134 having insulation 132 and (see Figure 3) supported on legs 26 and plate 27. The trough does not extend into the zone of the ice cutter, but its liner 134 extends upwardly so as to divert water down into the trough. Referring now to Figures 2 and 9, the trough is provided with a sump pocket 136 to which fresh water is supplied through a pipe 138 under the control of a water inlet valve 140 having a float 142. An overflow pipe 144 limits the height of the water and provides for the discharge of excess water through a water discharge pipe 146. Water is withdrawn from the bottom of the sump through a strainer 148 and a line 150 which extends (see Figure 4) to the water pump 110. A manual valve 152 is open to connect pipe 150 to the drain pipe 146, thus to drain the sump during a flushing out operation.

Referring again to Figure 3, trough 130 supports a cylindrical baffle 151 which extends upwardly parallel to the freezing surface and directs water downwardly if it tends to splash away from the freezing surface. As has been indicated above, water is supplied to the entire freezing surface, except at the zone adjacent the ice cutter and the entire freezing surface is refrigerated by direct expansion of the refrigerant. Referring to Figure 6, the freezing cylinder rotates clockwise and the rate of rotation is such that a layer of ice has formed on the freezing surface as it approaches the ice cutter.

It has been found that improved results are obtained for some types of operation if the water is removed from the surface of the ice prior to the harvesting or severing of the ice from the freezing surface. Accordingly, at the right of the cutter there is mounted a flat rubber scraper 153 which is so adjusted that its edge wipes the ice as the ice moves to the left toward the cutter. Thus, the water which is not frozen is wiped from the ice and is directed downwardly into trough 130. Surrounding the cutter is an ice chute 155 which extends downwardly and (see Figure 3) is open at the bottom so as to permit the ice to fall into a container or storage bin (not shown).

With this apparatus the ice cutter is rotated by its contact with the ice, and (see Figure 2) as the ice advances under the spiral wedge cutters the ice is wedged free and it falls from the freezing surface and downwardly through the ice chute. The wiping of the water from the ice prevents dripping of water down the ice chute, and the ice is dry at the time of removal and it tends to remain sub-cooled.

Figure 10:
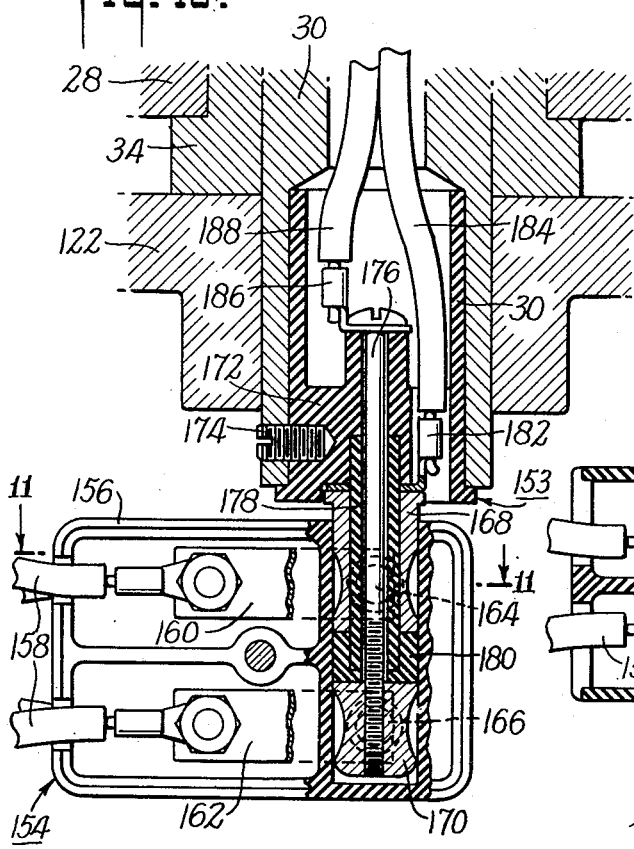
Figure 10 is a sectional view on the line 10—10 of Figure 4.
Figure 11:
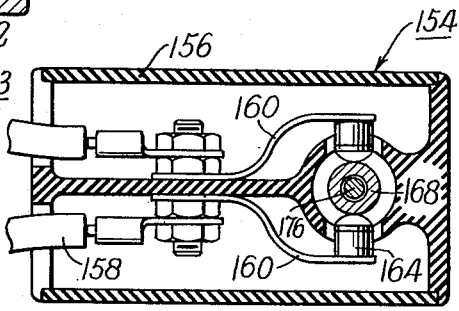
Figure 11 is a sectional view on the line 11—11 of Figure 10.

As indicated above, the refrigeration system is rotated and therefore the electrical connections to the compressor and fan motors are supplied through a slip ring arrangement. This arrangement is positioned at the bottom end of shaft 30 and (see Figure 3) is in the form of a male plug 153 and a female socket 154. Referring to Figures 10 and 11, socket 154 has a casing 156 of insulating material into which a pair of power supply lines 158 extend. These lines are connected through their terminals respectively, to two spaced pairs of spring arms 160 and 162 (see also Figure 11), which extend to the right and have contacts or brushes 164 and 166, respectively. Referring to Figure 10, contacts 164 and 166 respectively engage contact rings 168 and 170 of the male plug 153. Plug 153 has a cylindrical base 172 of insulating material and is fixed in place in the end of shaft 130 by a screw 174. A terminal bolt 176 extends from base 172 through a sleeve 178 also of insulating material and is threaded into ring 170 which also acts as a nut. Ring 168 is snugly fitted onto sleeve 178 and beneath it is an insulating collar 180.

Ring 168 is clamped against a terminal 182 which is attached to a wire 184 and the head of bolt 176 clamps a similar terminal 186 which, in turn, is connected to a wire 188. Wires 184 and 188 (see Figure 3) extend upwardly through shaft 30 to the motor control and capacitor assembly 190 which is mounted at the left of the motor compressor 68. Referring again to Figures 10 and 11, it is seen that the female socket 154 receives the male plug when the shaft 30 moves downwardly to the position shown, and this provides good electrical connections which are protected from dirt and from abuse. At the same time the rotating assembly comprising a refrigeration system may be removed without disturbing the electrical wire.

It has been pointed out above that the freezing surface 43 is maintained in refrigerated condition and the ice forms on this surface. The motor is controlled by assembly 190 and the machine is turned off and on by the switch 192 on the side of the machine. Water is caused to flow in an even sheet down the freezing surface, except at the zone of the cutter. The rate of water flow is in excess of that which freezes so that the ice tends to be clear and hard. The ice production is high and the quality is good. The operation of the machine is automatic in every respect and standard controls and safety devices are provided.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

I claim:

1. In ice-making apparatus, the combination of, a stationary structure including water supply and circulating means to circulate water through an arcuately extending freezing zone, a freezing cylinder presenting an outer vertical freezing surface positioned within said freezing zone, means mounting said cylinder for rotation about a vertical axis, a refrigeration system including a motor-compressor and condenser mounted to rotate with said cylinder and to cool said freezing surface, and ice-removing means positioned along the path of said freezing surface and adapted to remove ice therefrom.

2. Apparatus as described in claim 1 which includes, a stationary spider structure positioned beneath said cylinder and including a plurality of legs and a central hub into which said shaft is journalled, a water circulating pump positioned beneath said cylinder and constituting a portion of said water supply and circulating means, and drive means for rotating said cylinder including a gear mounted on the lower end of said shaft and a gear reduction mechanism operatively connected thereto.

3. Apparatus as described in claim 2 which includes, a mounting plate positioned above said cylinder and rigidly mounted on said shaft, means attaching said cylinder to said plate, a hermetically sealed motor-compressor mounted on said plate, and a condenser having a generally cylindrical configuration mounted on said plate and extending around said motor-compressor.

4. Apparatus as described in claim 3 which includes, housing means cooperating with said condenser to form a housing for said motor-compressor and the associated parts and including a top grill, and a motor driven fan mounted beneath said grill to cause air to flow therethrough to cool said condenser and said motor-compressor.

5. Apparatus as described in claim 4 wherein, said water supply and circulating means includes, an arcuate trough positioned beneath said freezing surface, an arcuate pipe positioned along the upper edge of said surface to spray water thereon, a water sump adapted to have water flow thereto from said trough, and a float controlled valve for supplying water to said sump to maintain a predetermined water level.

6. Apparatus as described in claim 5 wherein said cylinder comprises, a cylindrical wall presenting its outer surface to form said freezing surface, a liner snugly fitting inside said cylindrical wall with its edges welded thereto and forming a cylindrical evaporator chamber, a disc-like top wall welded at its outer periphery to the upper edge of said cylindrical wall, a somewhat conical bottom wall attached at its outer periphery to the bottom edge of said cylindrical wall, and a central hub extending between and attached to said top and bottom walls adjacent the axis thereof.

7. In ice making apparatus, the combination of, a rotatable refrigeration system comprising a hermetic motor-compressor and an air cooled condenser and a cylindrical structure forming an evaporator and a freezing surface mounted to rotate about a vertical axis, means constituting a supply of water to be frozen, a spray header, a water pump for spraying water from said header onto said freezing surface to form a sheet of ice on said surface, a helical wedge adapted for rotation relative to said freezing surface whereby successive strips of ice are freed from said surface.

8. In apparatus for manufacturing a congealed product, in combination: a rotatable congealing unit including a compressor, a condenser, and an evaporator which includes a cylinder presenting a substantially rigid freezing surface; means for supplying a liquid to be congealed to form a sheet of congealed material on said surface; and harvesting means for removing said congealed material including wedging means mounted for relative movement with respect to said freezing surface.

9. In apparatus of the class described, the combination of, a hermetic motor-compressor, an air cooled condenser, a fan for cooling said condenser, a cylindrical rigid freezing surface, and an annular evaporator chamber adjacent said freezing surface for cooling the same, unitary frame structure carrying the above-mentioned elements, bearing means rotatably supporting said frame structure, means for supplying water to said freezing surface, and helical wedge means for freeing the congealed liquid from said surface.

10. In congealing apparatus, the combination of, a vertically mounted cylindrical freezing surface, a horizontal hermetic motor-compressor mounted along the axis of rotation of said freezing surface, an arcuately extending air cooled condenser substantially surrounding said compressor, and a fan for passing air over said condenser mounted along the axis of rotation of said freezing surface, whereby the combination may be mounted to rotate as a unit to free congealed liquid from said freezing surface by contact with a rotatable helical wedge positioned adjacent said freezing surface.

11. In apparatus for congealing liquids of the type described, the combination of: a sealed unitary refrigerating system comprising an hermetic motor-compressor, a condenser and evaporator adapted for rotation about the central axis; means forming a substantially rigid freezing surface surrounding said evaporator; a helical wedge mounted for relative rotation by contact at said freezing surface whereby successive strips of said congealed liquid is freed from said surface.

12. In an ice making apparatus the combination of, a rotatable refrigeration system comprising a hermetically sealed motor-compressor, an air cooled condenser and a cylindrical evaporator and freezing surface mounted to rotate about a vertical axis, means constituting a supply of water to be frozen, a spray header for spraying water from said supply means onto said freezing surface to form a sheet of ice on said freezing surface, a wedging assembly mounted about a vertical axis closely adjacent said freezing surface for rotation relative thereto whereby successive strips of ice are freed from said surfaces.

13. In ice making apparatus the combination of, a rotatable refrigeration system comprising a hermetically sealed motor-compressor mounted substantially horizontally about a vertical shaft, an air cooled condenser substantially surrounding said motor compressor, a hollow annular chamber forming an evaporator and a cylindrical freezing surface mounted to rotate with said motor compressor about said vertical shaft, means constituting a supply of water to be frozen, a spray header disposed about the upper edge of said freezing surface, an arcuate trough positioned beneath said freezing surface, water circulating means for spraying water from said header onto said freezing surface to form a sheet of ice thereon and for recirculating water from said trough to said header, and a wedging assembly mounted about a vertical axis for rotation relative to said freezing surface by contact therewith whereby successive strips of ice are freed from said surface.

14. In apparatus for congealing liquids of the type described, the combination of, a sealed unitary freezing system comprising a hermetic motor-compressor, a condenser, an evaporator, and a substantially rigid freezing surface surrounding said evaporator fixed to a shaft extending therefrom; a vertically mounted bearing hub into which said shaft is journalled; water supply means including a spray header for flowing a layer of liquid over said freezing surface to form a layer of congealed liquid thereon, a wedging assembly mounted for relative rotation by contact at said freezing surface whereby successive strips of said congealed liquid are freed from said surface.

15. Apparatus as described in claim 14 wherein said bearing hub is mounted in a stationary spider structure positioned beneath said freezing cylinder and which has extending therefrom a plurality of supporting legs and carries thereon said spray header and water supply means including an arcuate trough positioned at the bottom of said freezing surface and a sump to collect the excess water from said trough.

References Cited in the file of this patent

UNITED STATES PATENTS

| Number | Name | Date |
|---|---|---|
| 1,020,759 | Holden | Mar. 19, 1912 |
| 1,155,780 | Audiffren | Oct. 5, 1915 |
| 1,594,390 | Van Stone | Aug. 3, 1926 |
| 1,934,147 | Roebel | Nov. 7, 1933 |
| 2,310,463 | Short | Feb. 9, 1943 |
| 2,358,756 | Zoller | Sept. 19, 1944 |
| 2,431,278 | Raver | Nov. 18, 1947 |
| 2,575,374 | Walsh | Nov. 20, 1951 |
| 2,585,020 | Lessard | Feb. 12, 1952 |